United States Patent [19]
Strother, Jr. et al.

[11] 3,921,171
[45] Nov. 18, 1975

[54] ULTRA-WIDE BAND MONOPULSE RADAR RECEIVER

[75] Inventors: Claude Strother, Jr., Los Gatos; John R. Clark, Corona, both of Calif.

[73] Assignee: The United States of America as represented by the Secretary of the Navy, Washington, D.C.

[22] Filed: May 15, 1964

[21] Appl. No.: 368,453

[52] U.S. Cl. .............................. 343/16 M; 343/18 E
[51] Int. Cl.² ........................................... G01S 9/22
[58] Field of Search ................ 343/16 R, 16 M, 119

[56] References Cited
UNITED STATES PATENTS
3,175,215    3/1965    Blasberg et al. ................... 343/16 M

*Primary Examiner*—T. H. Tubbesing
*Attorney, Agent, or Firm*—Richard S. Sciascia; Joseph M. St. Amand; T. M. Phillips

EXEMPLARY CLAIM

1. In a monopulse type radar receiver the combination comprising:
   a. a plurality of frequency -insensitive antennas arranged in an amplitude-sensitive array for receiving energy in the microwave region,
   b. a multi-channel lumped constant hybrid junction having a plurality of inputs corresponding to the number of said plurality of antennas and having a single output,
   c. a plurality of coupling circuits, each having a different time delay, for coupling the signals received at said antennas to the inputs of said hybrid junction,
   d. amplifier circuit means for amplifying the output signals from said hybrid junction,
   e. signal sorter means for providing a plurality of output signals corresponding to the plurality of signals received at said plurality of antennas,
   f. a summing circuit coupled to the output of said signal sorter for producing an output signal proportional to the sum of the output signals,
   g. a first differential circuit means coupled to the output of said signal sort for producing an output signal proportional to the difference of two of the output signals,
   h. a second differential circuit means coupled to the output of said signal sorter for producing an output signal proportional to the difference of two other of the output signals,
   i. signal processing circuit means coupled to the output of said first and second differential circuit means and to the output of said summing circuit for producing a first output signal proportional to the quotient of the output signal from said first differential circuit and the output signal of said summing circuit, and a second output signal proportional to the quotient of the output signal from said second differential circuit and the output signal of said summing circuit.

6 Claims, 2 Drawing Figures

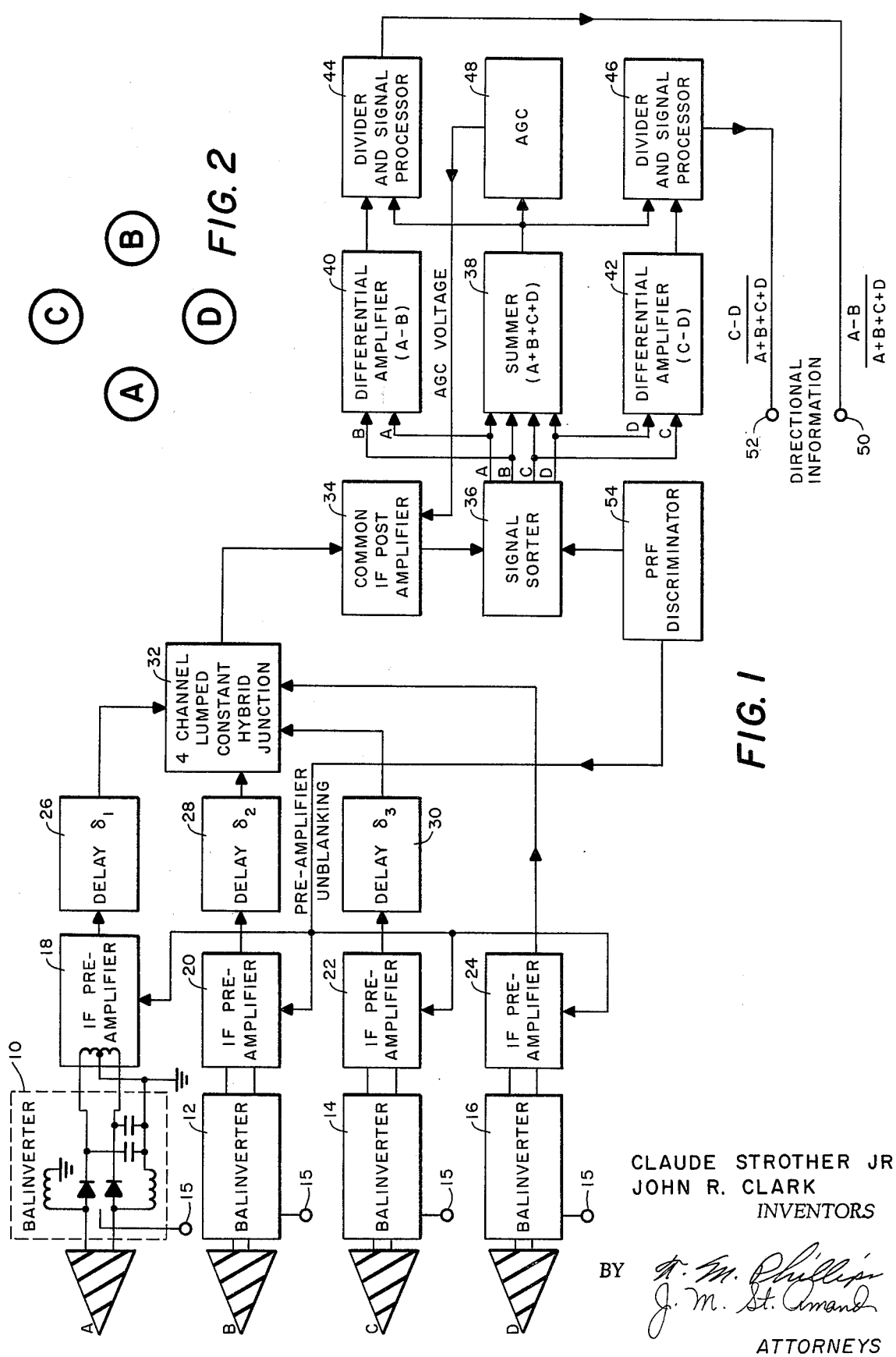

ULTRA-WIDE BAND MONOPULSE RADAR RECEIVER

The invention herein described may be manufactured and used by or for the Government of the United States of America for governmental purposes without the payment of any royalties thereon or therefor.

The present invention relates to radar receivers and more particularly to an ultra-wide band monopulse radar receiver wherein the effects of phase difference between signals received by the antenna is eliminated.

This invention also relates to improving immunity of radar receivers to electronic countermeasures, i.e., increasing the electronic counter countermeasures (ECCM) capability of the receiver.

In monopulse type radar receivers, the physical spacing and arrangement of the antennas inherently introduce phase differences which vary in amplitude when operating over a wide range of frequencies. The present invention permits the operation of monopulse type radar receivers over a wider range of frequencies by eliminating effects of phase differences.

An object of the present invention is to provide an amplitude-monopulse radar receiver which overcomes the changes in error-signal sensitivity caused by physical spacing between antenna elements and changes in the frequency of the received signals.

Another object of the invention is to provide a monopulse system in which the intermediate frequency portion of the system may operate with full level signals, which is accomplished by forming the error signal in the video-frequency section, so that the IF section need not operate on a difference signal which approaches zero at boresight.

A further object is to provide an amplitude monopulse system wherein all signal processing is accomplished at video frequencies, and thus does not require the use of frequency band limited microwave processing circuitry.

Still another object is to provide an amplitude monopulse system in which spacing between the antenna feeds is not critical.

Still a further object of the invention is the provision of a frequency insensitive monopulse receiver, capable of operating over a decade, or greater, bandwidth and is insensitive to the phase of the local oscillator signal used in each of the microwave mixers.

Another object of this invention is to provide immunity to the electronic countermeasure (ECM) technique of image jamming, whereby the ECM pulse is transmitted at the image frequency of the radar receiver to invert the sense of the tracking error signal as a result of the image-phase reversal occurring in the mixer of a conventional receiver.

Another object of this invention is to extend the ECCM capability of a radar receiver (over the state-of-the-art as currently practiced) by allowing pulse-to-pulse frequency hopping over extended ranges.

Another object of this invention is to affect immunity of a radar receiver to the ECM technique of cross-polarization jamming and other types of ECM that depend on inverting the tracking sense by phase inversion in the microwave stages of the receiver.

Other objects and many of the attendant advantages of this invention will become readily appreciated as the same becomes better understood by reference to the following detailed description when considered in connection with the accompanying drawings wherein:

FIG. 1 is a block diagram of a preferred embodiment of the invention.

FIG. 2 shows the antenna configuration employed in the embodiment of FIG. 1.

Referring now to FIG. 1 of the drawing there is shown antennas A, B, C and D arranged in an amplitude-sensitive array (see FIG. 2). Antennas A, B, C and D are of the frequency-insensitive conical spiral type such as that shown and described in U.S. Pat. No. 2,958,081 issued Oct. 25, 1960. Each of antennas A, B, C and D are center fed and are coupled through balinverters 10, 12, 14 and 16 respectively to intermediate frequency pre-amplifiers 18, 20, 22 and 24. Balinverters 10, 12, 14 and 16 are of a special type of balanced mixer that accepts balanced inputs such as that shown and described by Strother, Jr., et al, "Balinverter-Frequency Sensitive Balanced Converter" *Electronics* (Nov. 2, 1962) pp. 46–47. The signal from the local-oscillator (not shown) is applied to terminals 15 of balinverters 10, 12, 14 and 16. The outputs of pre-amplifiers 18, 20 and 22 are coupled respectively through delay line 26, 28 and 30 to a four channel lumped constant hybrid junction 32. Pre-amplifiers 18, 20, 22 and 24 may be of any well known type IF amplifier while delay lines 26, 28 and 30 may be of the bandpass filter type. Hybrid junction 32 may be of the type shown and described in U.S. Patent application Ser. No. 254,525 for Lumped Constant Hybrid Junction, filed Jan. 28, 1963 by Claude Strother, Jr. et al., now abandoned. The output of pre-amplifier 24 is coupled directly to hybrid junction 32.

The output signals from hybrid junction 32 are coupled to a high-gain post-amplifier 34 where they are amplified and fed to signal sorter 36 which performs the reverse operation of IF delay lines 26, 28 and 30 and the four channel hybrid junction 32. The four outputs from signal sorter 36 are fed into a summing circuit wherein a sum signal, A+B+C+D, is obtained. The outputs from A and B channels are applied to differential amplifier 40 wherein a difference signal, A−B, is formed. Similarly, the outputs from channels C and D are applied to differential amplifier 42 wherein a difference signal C−D is obtained.

The summed output signal, A+B+C+D is coupled as inputs to divider circuits 44 and 46 and to automatic gain control circuit 48. Also coupled as inputs to divider circuits 44 and 46 are the outputs of differential amplifiers 40 and 42, respectively. The output signal from divider circuit 44, $$\frac{A-B}{A+B+C+D},$$

appears at terminal 50, and the output signal from divider 46, $$\frac{C-D}{A+B+C+D},$$

appears at terminal 52.

Pulse repetition frequency discriminator 54 coupled to signal sorter 38 and pre-amplifiers 18, 20, 22 and 24 provides a means of selecting one signal from many (in a multi-signal environment) on the basis of pulse repetition frequency.

The output of AGC circuit 48 is applied to common IF post amplifier 34 to control the gain.

In operation, the signals received at antennas A, B and C are fed to hybrid junction 32 through delay circuits 26, 28 and 30. The signal received at antenna D is applied to hybrid junction 32 without any delay. Each signal is delayed a different time interval: the signal from antenna D- channel is not delayed; the signal from antenna C- channel is delayed, for example, three $\mu$ sec; the signal from antenna B- channel is delayed two $\mu$ sec; and the signal from antenna A- channel is delayed one $\mu$ sec. The four signals are combined in the four-channel, lumped-constant hybrid junction 32 where an output of four sequential pulses at the intermediate frequency appears; thus, the signals from the four channels can be amplified without interaction in conventional, high-gain post-amplifier 34, which eliminates the problem of maintaining equal gain in four separate IF post-amplifiers. In actual practice it has been found that amplifier 34 should provide 100 db maximum gain with a dynamic range of gain control of 80 db under the influence of AGC 48. The amplified signals are sorted in signal sorter 36 to provide four independent output signals corresponding to the signals received at antennas A, B, C, and D. For ease in later processing, each signal may be stretched to form a dc voltage (wide pulse). The output signals from a signal sorter are added in summer 38 to form an output signal, A+B+C+D. The difference is taken of signals A and B, and also C and D. The difference signals A−B and C−D are applied to dividers 44 and 46, respectively, which provide two dc output signals which are proportional to the quotients $(A-B) \div (A+B+C+D)$ and $(C-D) \div (A+B+C+D)$. These quotients are analogous to the projections of the angle of arrival of the received signal on the A−B and C−D antenna planes, respectively. Thus the operation of the divider system, with the assistance of the AGC circuit, effects the signal normalization process which is necessary for the derivation of directional information from the received signals on a pulse-to-pulse basis.

This invention has the ECCM feature of being immune to the ECM technique of image jamming in the following way. In considering the output of the mixer of a conventional monopulse receiver the following phasor diagram may be used.

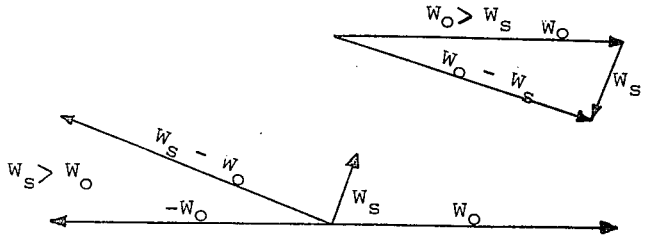

where
$W_o$ = local oscillator radian frequency
$W_s$ = signal frequency
$W_o - W_s$ & $W_s - W_o$ = signal to the intermediate frequency amplifier.

It is apparent that interposition of the oscillator and signal frequencies will cause a 180° phase reversal at the input to the IF amplifier. This in turn will invert the sense of the error signal generated in a phase or amplitude monopulse radar as commonly practiced.

Therefore, if a jamming signal at the image frequency is transmitted to the radar receiver in response to illumination by the radar transmitter, the resulting interference will produce a signal at the IF amplifier that is out of phase with the reflected return. This false signal, if its amplitude is significantly larger than the reflected return, will drive the radar out of track.

In the case of the radar receiver using the principles described in this invention there is no sensitivity to the phase of the signals involved — i.e., only the signal amplitudes are significant. Therefore, immunity to image jamming is accomplished with the practice of this invention.

The conventional phase or amplitude monopulse receiver is sensitive to phase response in another way. Assume an ECM device that is designed to sense the polarization of the radar signal. Also, assume that the ECM ECM device can transmit a responding signal in quadrature polarization to the impinging signal. This will produce an out-of-phase error signal in the hybrid sections normally used to process the antenna signals.

Obviously many modifications and variations of the present invention are possible in the light of the above teachings. It is therefore to be understood that within the scope of the appended claims the invention may be practiced otherwise than as specifically described.

What is claimed is:

1. In a monopulse type radar receiver the combination comprising:
    a. a plurality of frequency-insensitive antennas arranged in an amplitude-sensitive array for receiving energy in the microwave region,
    b. a multi-channel lumped constant hybrid junction having a plurality of inputs corresponding to the number of said plurality of antennas and having a single output,
    c. a plurality of coupling circuits, each having a different time delay, for coupling the signals received at said antennas to the inputs of said hybrid junction,
    d. amplifier circuit means for amplifying the output signals from said hybrid junction,
    e. signal sorter means for providing a plurality of output signals corresponding to the plurality of signals received at said plurality of antennas,
    f. a summing circuit coupled to the output of said signal sorter for producing an output signal proportional to the sum of the output signals,
    g. a first differential circuit means coupled to the output of said signal sorter for producing an output signal proportional to the difference of two of the output signals,
    h. a second differential circuit means coupled to the output of said signal sorter for producing an output signal proportional to the difference of two other of the output signals,
    i. signal processing circuit means coupled to the outputs of said first and second differential circuit means and to the output of said summing circuit for producing a first output signal proportional to the quotient of the output signal from said first differential circuit and the output signal of said summing circuit, and a second output signal proportional to the quotient of the output signal from said second differential circuit and the output signal of said summing circuit.

2. The radar receiver of claim 1 wherein said plurality of antennas comprises four frequency-insensitive conical spirals.

3. The receiver of claim 2 wherein the output of one of said four antennas is coupled to said hybrid junction without any delay, the output of a second of said four antennas is coupled to said hybrid junction with a first predetermined amount of delay, the output of a third of said four antennas is coupled to said hybrid junction with a delay different from said first predetermined amount, the output of the fourth of said four antennas is coupled to said hybrid junction with a delay different than either of said first or second predetermined delays.

4. The receiver of claim 3 wherein said hybrid junction combines the signals from said four antennas for producing four sequential pulses at the intermediate frequency.

5. The receiver of claim 1 wherein the output of said summing circuit is coupled as an input to said amplifier circuit means as an automatic gain control.

6. A radar receiver of claim 1 wherein said receiver operates over a decade plus frequency band and excludes jamming signals that depend on inverting the tracking sense by phase inversion in the microwave stages of said receiver.

* * * * *